United States Patent [19]
Whitehead

[11] Patent Number: 4,733,229
[45] Date of Patent: Mar. 22, 1988

[54] HIGHLIGHTING GRAY SCALE VIDEO DISPLAY TERMINAL

[76] Inventor: Frank R. Whitehead, 9307 Ridgeside La., Orangevale, Calif. 95662

[21] Appl. No.: 573,833

[22] Filed: Jan. 24, 1984

[51] Int. Cl.$^4$ .............................................. G09G 1/14
[52] U.S. Cl. .................................. 340/723; 340/709; 340/747
[58] Field of Search ............... 340/724, 709, 723, 721, 340/734, 744, 747, 703, 793

[56] References Cited

U.S. PATENT DOCUMENTS

| | | | |
|---|---|---|---|
| 4,200,867 | 4/1980 | Hill ................................. | 340/709 X |
| 4,232,311 | 11/1980 | Agnita ............................ | 340/709 X |
| 4,345,313 | 8/1982 | Knox ................................ | 340/709 X |
| 4,395,707 | 7/1983 | Satrape .......................... | 340/723 X |
| 4,467,322 | 8/1984 | Bell et al. ..................... | 340/709 X |
| 4,481,594 | 11/1984 | Staggs et al. ................ | 340/703 X |
| 4,495,491 | 1/1985 | Postl .............................. | 340/723 X |
| 4,533,910 | 8/1985 | Sukonick et al. ............. | 340/724 X |

Primary Examiner—Marshall M. Curtis
Attorney, Agent, or Firm—Weissenberger & Peterson

[57] ABSTRACT

In a CRT display of digitized gray scale information from a diagnostic scan, an operator-selectable area of the display can be highlighted to increase the contrast and brightness of a selected portion of the image while simultaneously viewing a wide range of information levels in the background portion of the image. The highlighted area and the background may encompass different operator-selectable information level windows. To accommodate the wide dynamic range necessary for such a display, and eliminate possible contouring effects when enhancing dark areas of the image, more gray scale display levels are used than are commonly used with diagnostic scanning systems, and full black on the CRT is set to correspond to a minimum digital display level sufficiently high so that no single display step results in more than a maximum predetermined contrast ratio in the display. Use of this minimum digital display level also improves the implementation of various non-linear transfer curves for image inversion and compensation of photographic film characteristics.

17 Claims, 11 Drawing Figures

FIG. 6

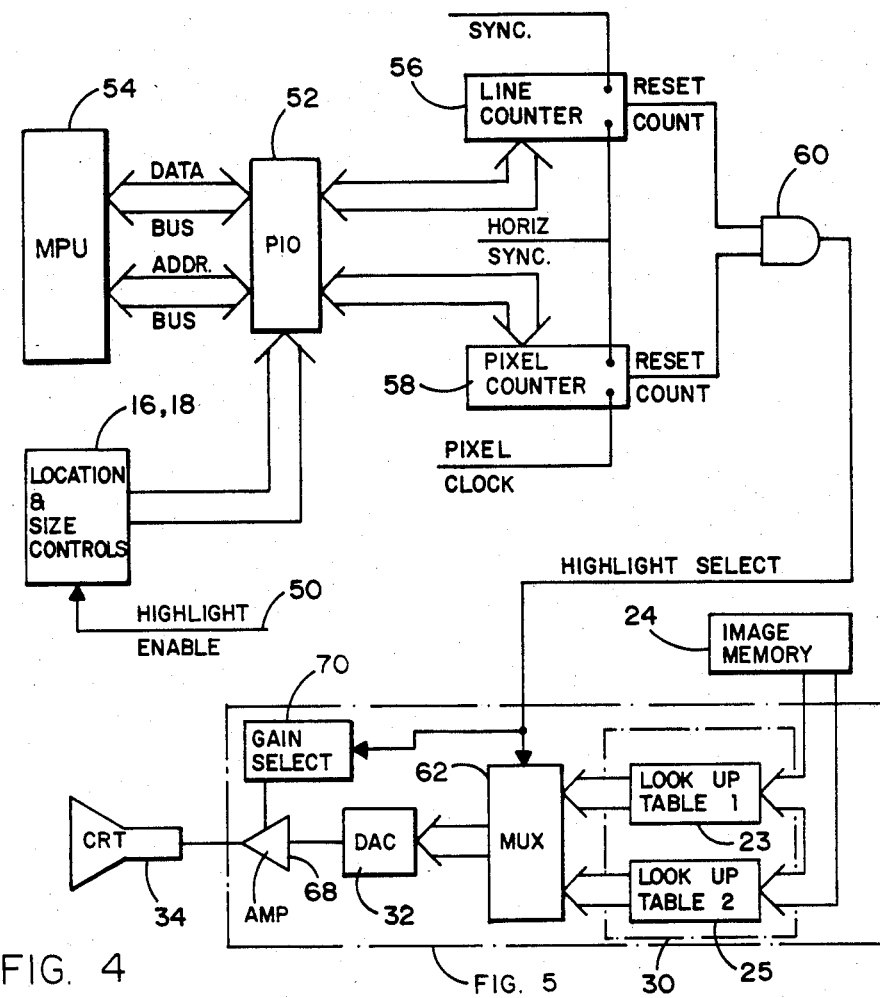
FIG. 4
FIG. 5
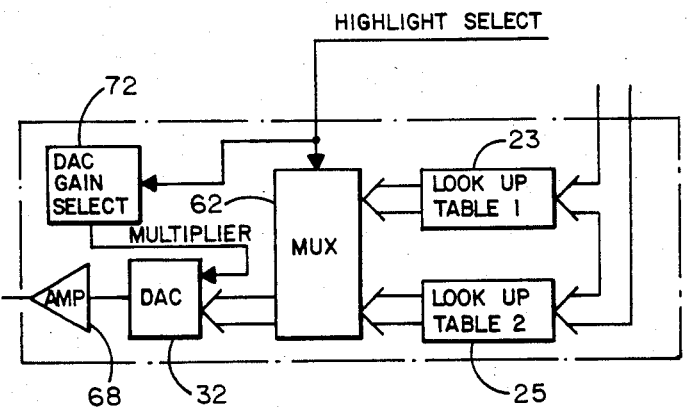
FIG. 5a

HIGHLIGHTING GRAY SCALE VIDEO DISPLAY TERMINAL

BACKGROUND OF THE INVENTION

Conventional digital images for diagnostic medical imaging systems traditionally use on the order of 256 gray scale display levels to produce the image on a cathode ray tube (CRT). These 256 display levels are often allocated to more, or fewer, information levels of the original digital data by windowing the information levels through a digital look-up table that contains some desired data level-to-display level correspondence function, i.e. a gray scale transfer curve. The usual purpose of such windowing is to increase selected contrast ratios in the displayed image over what they would be without windowing. For example, in an x-ray image containing 256 digital information levels, the information levels for normal tissue in a particular organ might cluster around level 200, while diseased tissue in that organ would tend to have information levels clustered around level 210. The contrast ratio between the diseased and normal tissue is therefore (210–200)/200 or 5%—a value that may or may not be easily perceived by an observer, depending on various factors such as the sharpness of the boundary between the diseased and normal tissue, displayed image brightness, glare from other parts of the image etc.

If the display system gray scale window is set so that only data levels from 150 to 250 are assigned with a linear relationship to the 256 display levels, then the normal tissue information level of 200 would be displayed at level 127, while the diseased tissue level of 210 would now be displayed at level 153, giving a contrast ratio of 20%, or 4 times as much as before.

The problem with this windowing technique is that while contrast ratios for information levels within the window range are enhanced, information levels outside the window range cannot be viewed simultaneously, forcing the operator to sequentially examine successive information level ranges of the same image, and mentally integrate all of them into a diagnosis. This is, at best, a time-consuming and difficult procedure requiring considerable skill, as a high-quality x-ray CRT image can have up to 2,048 information levels to cover the density range from bone to air. The conventional windowing technique therefore presents a trade-off between a high-contrast display of a narrow dynamic range of information levels, and a low-contrast display of a wide dynamic range of information levels.

Another problem with conventional windowing techniques is that under some conditions, high contrast ratios for single steps of the lower display levels can be perceived by the eye, as an annoying contour effect along sharp edges. To avoid such contouring, it is desirable to keep the single-step contrast ratio below about 2% in even the darkest portions of the image.

A third problem occurs with many video display systems when it is desired to photograph the image using negative transparency film. To produce the same polarity film image as was viewed on the monitor, it is necessary to invert the relationship between the image information levels and the displayed gray scale levels, using a non-linear transfer curve. The small contrast ratios contained in the upper information levels selected for windowing are often poorly reproduced in the inverted gray scale display because of insufficient resolution in the lower, or dark, portion of the displayed levels. Depending upon the inversion transfer function used, significant loss of image information may occur in the photographic copy because of the round-off error.

SUMMARY OF THE INVENTION

The invention overcomes all of the aforementioned problems of the prior art by using a high-intensity (e.g. 700–1000 NITS) CRT combined with operator-selectable highlighting to allow simultaneous display of an intensified, contrast-enhanced area of the image along with a wide-dynamic-range display of the remaining or background portion of the image. To provide the increased dynamic range required for such a display, a large number of gray scale display levels (e.g. 1024 to 4096) are used.

Preferably, the background portion of the image is displayed using only the lower display levels which encompass the brightness range of a conventional 350–500 NITS CRT screen. The highlight area can then be intensified, even in the brightest portion of the image, by using the full range of display levels available on the high-intensity CRT. The major problem of sacrificing dynamic range when windowing the information levels to provide contrast enhancement of the displayed image is thus overcome by using the operator-selectable highlight area to enhance the contrast of a selected portion of the image while simultaneously viewing a wide range of information levels in the rest of the image.

To prevent excessive gray scale contouring when highlighting dark areas of the image, or round-off errors when inverting with non-linear transfer curves (either for viewing a black-on-white image, or for producing a white-on-black image with negative photographic film), a minimum display level of approximately 50 is set to correspond to full black on the CRT. As a result, no single step contrast ratios larger than 1 part in 50, or 2%, are displayed, even in the darkest portions of the image. This effectively eliminates any contouring effects due to perception of single display level changes. The 2% maximum contrast ratio is still adequate when inverting the images to produce a photographic copy, as it is usually coincident with the toe of the response curve for the films commonly used, and therefore remains at a visually imperceptible level in the final image.

It is therefore the object of the invention to provide a display system for digitized gray scale information in which simultaneous viewing of an intensified, contrast-enhanced, operator-selectable highlight area is provided together with a wide-dynamic-range background image, and in which windowing techniques are employed at least in the highlight area to select the range of information levels displayed.

It is a further object of the invention to enhance the usefulness of the described dual-windowing system by using a special high-brightness CRT to provide a wider dynamic range of luminance values, and/or allow use of the display system in rooms with bright ambient illumination.

It is another object of the invention to simultaneously provide sufficient dynamic range and contrast uniformity with low round-off errors in the described system by using considerably more display gray scale levels than information gray scale levels.

It is still another object of the invention to eliminate contour-like perception of displayed differences of one information gray scale level, and to further reduce round-off errors when using an inverted gray scale, by assigning no information levels to display levels of less than approximately 50.

BRIEF DESCRIPTION OF THE DRAWINGS

FIG. 4 is a block diagram of a preferred embodiment of the apparatus of this invention; and FIGS. 5a and 5b are alternative embodiments capable of being substituted for the portion of the apparatus contained within the box marked "FIG. 5" in FIG. 4.

DESCRIPTION OF THE PREFERRED EMBODIMENT

Figure 1:
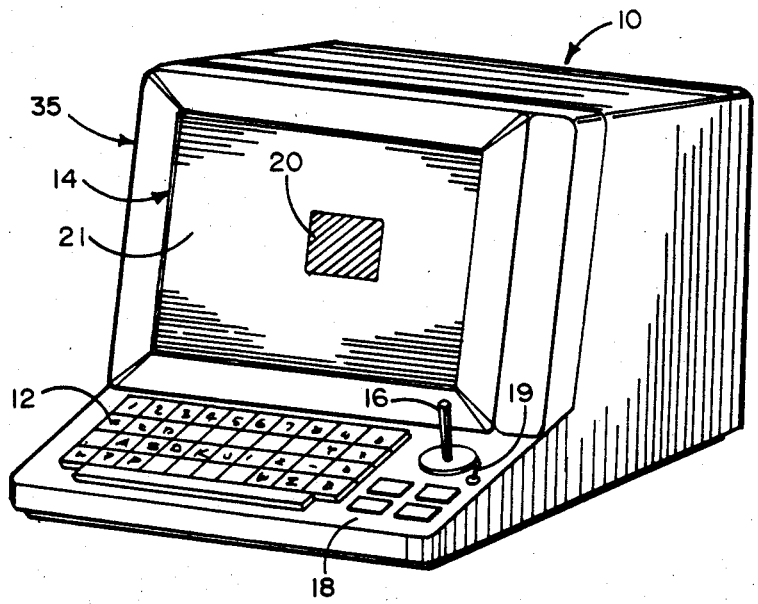
FIG. 1 is a perspective view of a display system constructed in accordance with this invention.

FIG. 1 shows a CRT display terminal of generally conventional construction but with special adaptations to carry out the purposes of this invention. The terminal 10 may have a generally conventional keyboard 12 for selecting, i.a., the windowing parameters for the display, and a CRT 35 which is scanned in the conventional manner but which is of the high-intensity type, with a maximum brightness in the range of 700-1000 NITS, instead of the more usual 350-500 NITS.

Figure 2:
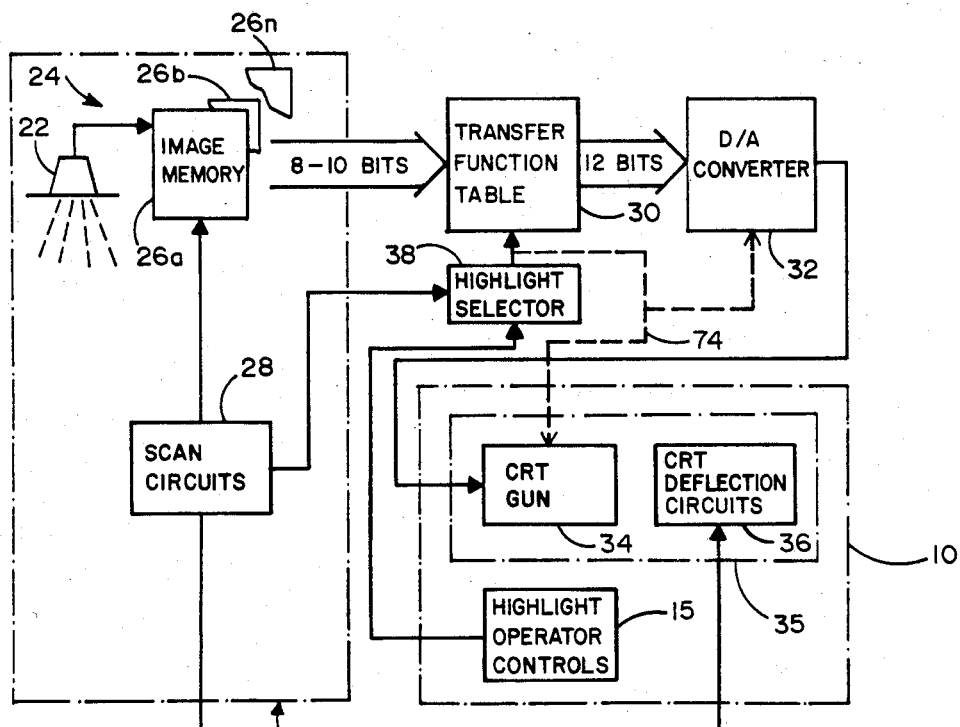
FIG. 2 is a block diagram illustrating the overall function of the invention.

The terminal 10 used in this invention has highlighting controls 15 consisting preferably of a joy stick 16, size controls 18, and a highlighting enable switch 19. The joy stick 16 is arranged in a conventional manner to move the highlight area 20 around within the background image 21 on the screen 14, while the size controls 18 are arranged in a conventional manner to vary the width and height of the highlight area 20.

turning now to FIG. 2, which shows the overall system of this invention, an ultrasonic or x-ray scan is produced by an appropriate scanning device 22. The data derived from the scan is digitized and transmitted in real time to the look-up tables 23, 25 (FIGS. 4 and 5), or it may be stored in an image memory 24 in digital form. The image memory 24, if used, may consist of a plurality of memory planes 26a through 26n. Each memory plane stores one digit of the gray scale intensity information for each pixel of the total image. Conventional scan circuits 28 scan the image memory 24 on a pixel-by-pixel basis so that, for each pixel of the image to be displayed on the screen 14, one bit from each of the memory planes 26a through 26n is transmitted in parallel to the transfer function memory 30 which contains the look-up tables 23, 25.

The transfer function memory 30 is preferably a bipolar high-speed random-access memory, as the transfer functions for the background image 21 and/or the highlight area 20 must be rewritten into the look-up tables 23, 25 each time a different window is selected. Two look-up tables are required because the transfer function for the background image 21 is different from the transfer function for the highlight area 20, and the two functions must be alternated in each CRT raster line that traverses the highlight area 20. In the case of a typical ultrasound scan with 256 gray scale information levels, the digitized information transmitted to the transfer function memory 30 would consist of eight bits; for a typical x-ray scan with 1,024 gray scale levels, it would consist of 10 bits.

The look-up tables 23, 25 of the transfer function memory are conventional look-up tables which receive the digitized information level number and convert it into a digitized control signal level number (which linearly corresponds to an intensity level of the display) in accordance with a selected transfer function, as discussed in more detail below. In the preferred embodiment of this invention there are 1,024 to 4,096 display levels expressed by up to twelve data bits which are applied to the digital-to-analog converter 32. The converter 32 transforms the digital display level number into an analog signal which can be amplified and applied to the gun 34 of cathode ray tube 35 to produce a level of screen brightness, in the pixel being scanned, corresponding to the display level determined by the table 30. The location of the pixel on the screen 14 is determined by the conventional deflection circuits 36 of the CRT 35.

The highlight operator controls 15 actuate a highlight selector 38 which, when the scan circuits 28 define a pixel lying in the highlight area 20, selects the look-up table 25 containing the highlight area transfer function to produce the highlighted portion of the image. The highlight selector 38, in the various embodiments of this invention, not only selects a different look-up table in the transfer function memory 30 for the highlighted area, but also intensifies the image in that area. It does so by any convenient method, e.g. by increasing the gain of the digital-to-analog converter 32 or the amplification of the analog signal produced by the converter, or by switching in additional electron guns in a multi-gun CRT to increase the brightness of the scanned pixel by a predetermined factor.

FIG. 3 illustrates transfer functions which may be used in the preferred embodiments of this invention. The abscissa of the graphs of FIG. 3 is the image memory output or information level applied to the transfer function memory 30, while the ordinate is the CRT luminance signal or display level produced by the transfer function memory 30. At the lower end of the graphs of FIG. 3, it will be noted that (for reasons discussed below) the first forty-nine display levels are made unavailable on the screen 14 and do not correspond to any information level. Display level 50 corresponds to the lowest information level of each illustrated window (or the highest information level in the inverted window of FIG. 3e) and is perceived on the screen 14 as full black.

The transfer functions of FIG. 3 are to be regarded as examples only, as any set of transfer curves which produces a higher contrast for a smaller window of information levels in the highlight area as opposed to the background would carry out the primary object of the invention.

The preferred transfer curves for this invention satisfy the equation:

$$C_{out} \simeq Y C_{in}$$

where
$C_{out} = \Delta d/d$
$C_{in} = \Delta i/i$
$\Delta d$ = number of display steps between two given pixels.
d = display level of the darker pixel.

$\Delta i$ = number of information steps between the given pixels.

$i$ = information level of the darker pixel.

$Y = \log(d_{max}/d_{min})/\log(i_{max}/i_{min})$.

$d_{max}$ = highest display level of selected window.

$d_{min}$ = lowest display level of selected window.

$i_{max}$ = highest information level of selected window.

$i_{min}$ = lowest information level of selected window.

Figure 3A:
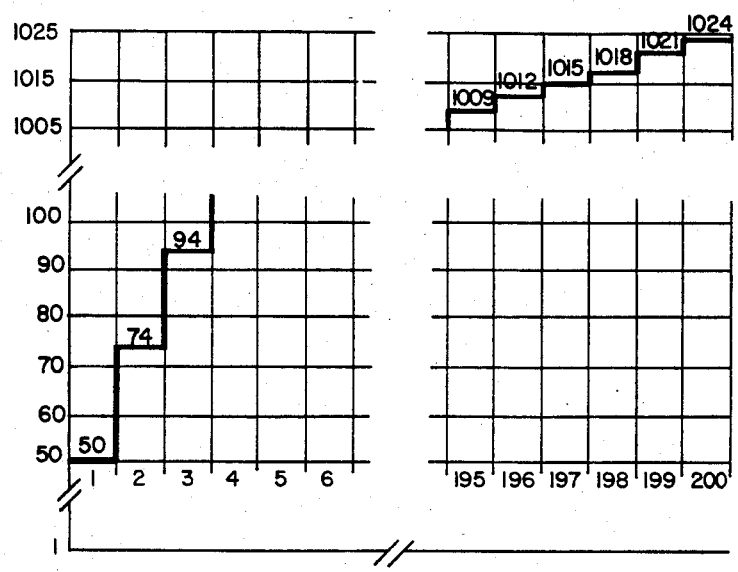
FIGS. 3a through 3e are partial transfer function diagrams illustrating the nature of typical transfer functions which may be used in the invention.
Figure 3B:
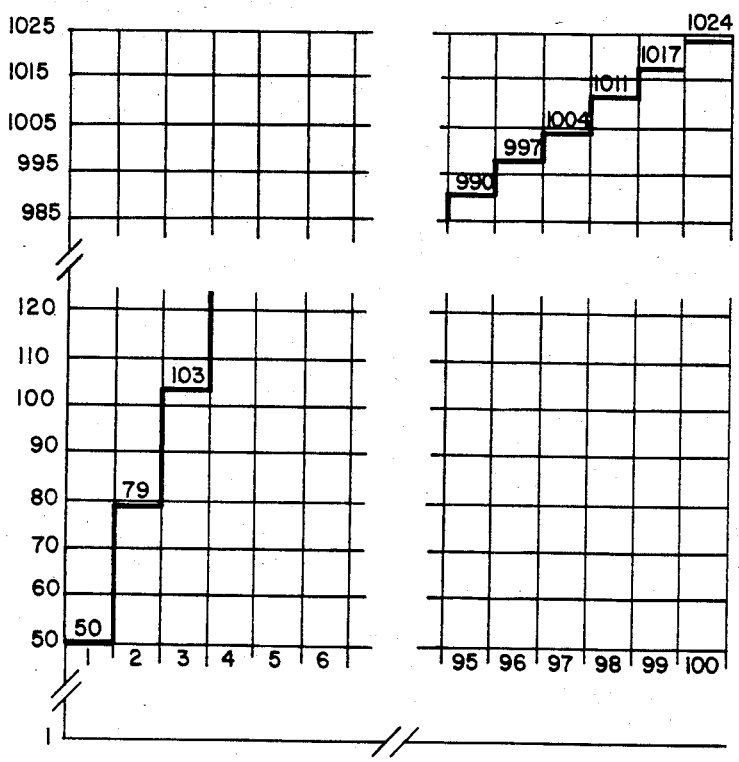
Figure 3C:
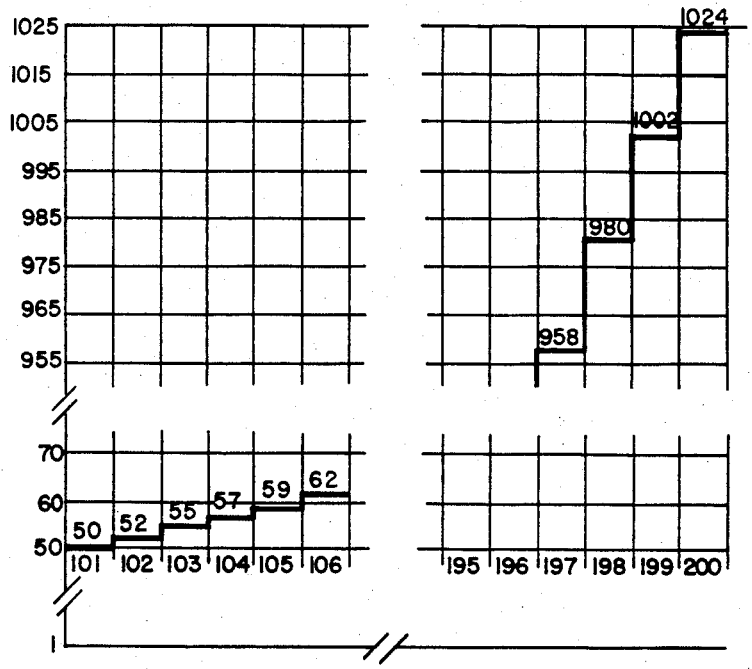
Figure 3D:
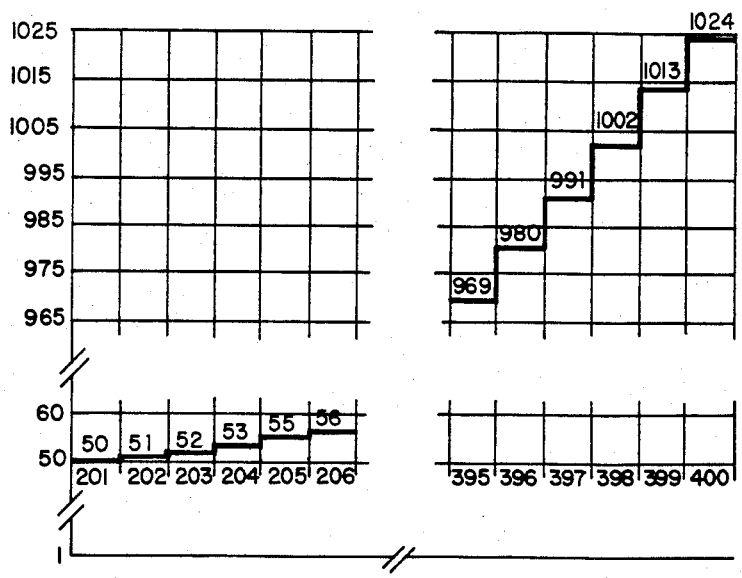

FIG. 3 illustrates a transfer curve for a background window of information levels 1 to 200 with 1024 display levels;

FIG. 3b illustrates the curve for a highlight window of information levels 1 to 100;

FIG. 3c illustrates the highlight curve for levels 101 to 200;

FIG. 3d illustrates the background curve for levels 201 to 400; and

Figure 3E:
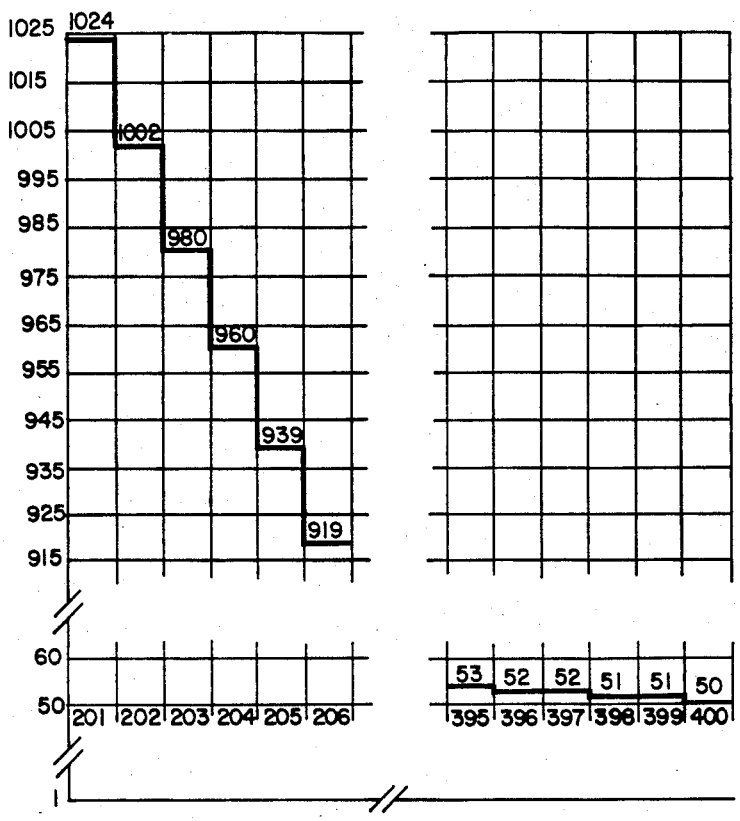

FIG. 3e illustrates the corresponding curve for an inverted gray scale.

Several things should be noted with respect to FIGS. 3a through 3d. First (because Y is a constant for any given window), the preferred transfer curves preserve the relative contrast of different objects with respect to, e.g., background noise regardless of the size and position of the window. For example, if the contrast between an object A and the background noise is twice as great as the contrast between an object B and the background noise, this relationship will hold true regardless of the window settings, even though the absolute contrasts between object A and the noise, and between object B and the noise, do change with different window settings.

Secondly (because the minimum display level is 50, and no integer display level can differ by more than one-half of a display level from the exact display level value of the transfer curve), the display level round-off error can never exceed ±1%. This is important when the gray scale is inverted (FIG. 3e) as, for example, in the production of a photographic negative.

In an inverted gray scale, the maximum percentage of round-off error occurs at the high information levels, where most of the diagnostic interest lies. If the entire 1024-step display range were used, round-off errors at high information levels could reach a diagnostically intolerable ±50%.

Thirdly, (again because of the use of a minimum display level of 50), at least in windows which do not extend down to the lowest (and diagnostically least interesting) information levels, the maximum contrast ratio $\Delta d/d$ between the display levels corresponding to adjacent information levels can readily be kept low enough to essentially eliminate annoying contour effects in certain sharp image transitions. Ideally, this ratio should be kept below 2%, a condition which occurs whenever a single upward step from the information level corresponding to display level 50 results in a display level increase no greater than 1.

Although transfer functions can be used which use a wider range of display levels in the highlight area than in the background area, it is more practical, for reasons of hardware economics, to use the same range of display levels for both areas but to make the highlight area brighter by increasing the gain. For example, on a 1,000 NITS screen, each display step may correspond to about 0.5 NITS in the background area, and to about 1 NITS in the highlight area.

The brightness increase in the highlight area only improves visibility and makes the highlight area stand out; the increased contrast and dynamic range are the result of the narrower windowing in the highlight area.

Although a conventional CRT display system used in diagnostic work usually has only about 256 display levels, it is preferable in this invention to use a high-intensity CRT and from 1,024 to 4,096 levels. This is true because with a minimum display level of 50, the dynamic range of the display would be only 256/50, or about five to one. This is inadequate for diagnostic purposes. By contrast, the described embodiment of the invention has a dynamic range of 1,024/50, or more than twenty to one. In addition, a larger number of display levels allows the contrast ratios between adjacent information levels to be made more uniform throughout a given window. A larger number of display levels also reduces the round-off error percentage when using non-linear and inverted transfer curves.

FIG. 4 illustrates a typical system suitable for accomplishing the highlighting function of this invention. In that figure, the highlight enable signal 50 from highlight enable switch 19 (FIG. 1) enables the location and size controls 16, 18 to feed location and size information to the programmable input-output chip 52. The PIO chip 52 transfers that information to the microprocessor unit 54. The MPU 54 then calculates the line and pixel coordinates of the display which form the boundaries of the area to be highlighted. The calculated data is transferred through the chip 52 to the line counter 56 and pixel counter 58. The line counter 56 counts horizontal synchronization pulses and is reset by the vertical synchronization pulses. The pixel counter 58 counts pixel clock pulses and is reset by the horizontal synchronization pulses.

When the line count and pixel count are both within the range determined by the microprocessor 54, the AND gate 60 enables the multiplexer 62 so as to switch the transfer function memory 30 from the look-up table (which contains the transfer function for the background image 21) to the look-up table 25 (which contains the transfer function for the highlight area 20). The output data of the selected lookup table in the transfer function memory 30 is applied to the digital-to-analog converter 32 which produces an analog signal corresponding to the display level determined by the appropriate look-up table. The analog output signal of the converter 32 is amplified in a conventional amplifier 68 and is applied as the intensity signal to the CRT gun 34. Simultaneously with the multiplexer 62, the AND gate 60 also enables the gain control 70 to increase (e.g. double) the gain of amplifier 68 in order to produce the highlighting effect.

Figure 5B:
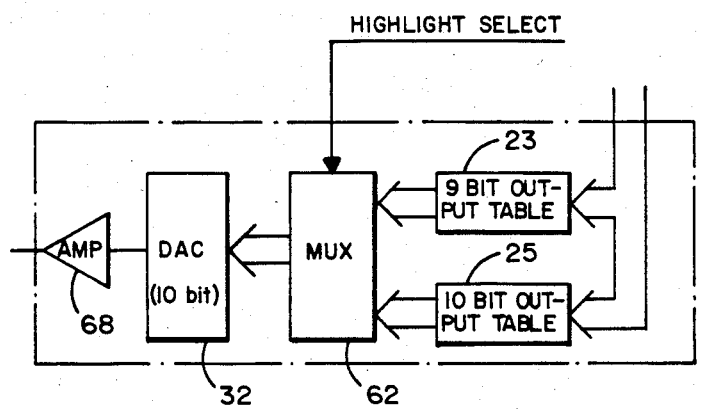

FIGS. 5a and 5b illustrate alternative ways of producing the highlighting effect. In the embodiment of FIG. 5a, the analog gain control 70 is replaced by the DAC gain selector 72, which inserts a multiplying factor into the output of the digital-to-analog converter 32.

In the embodiment of FIG. 5b, a look-up table 23 with a nine-bit output is used for the background area 21, while a ten-bit look-up table 25 is used for the highlight area 20. In that embodiment, the look-up table 25 itself provides the highlighting without any need for a separate gain boost.

In addition to the alternative embodiments illustrated in FIGS. 4, 5a and 5b, it is also possible to achieve highlighting by switching in a second CRT electron gun 34 whenever the AND gate 60 is enabled, as indicated by the dotted line 74 in FIG. 2.

Basically, the highlighting allows the diagnostician to increase the contrast in a selected area of interest while examining a digital image, by selectively narrowing the window and increasing the brightness in the highlight area. The preferred embodiment of the invention, by virtue of the minimum display level feature, additionally provides a contour-free image and makes possible an inversion of the gray scale in the display without creating excessive round-off errors in diagnostically meaningful areas of the image.

Figure 6:
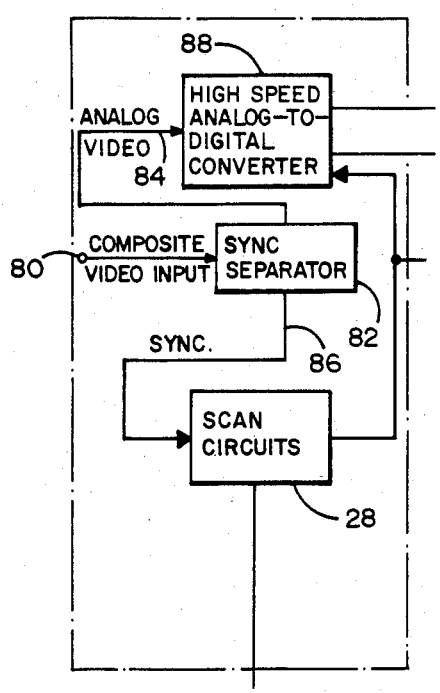
FIG. 6 is an alternative embodiment capable of being substituted for the portion of the apparatus contained within the box marked "FIG. 6" in FIG. 2.

FIG. 6 illustrates the fact that the present invention can be used not only to process information provided by an image memory, but also to process and improve, in real time, information which is already in video format. In FIG. 6, a composite video input 80 is applied to a conventional sync separator 82 which puts out an analog video signal 84 and a synchronization signal 86.

Whereas in FIG. 2, the scan circuits 28 generate the master timing for the system, the master timing in the alternative embodiment of FIG. 6 is provided to the scan circuits 28 by the synchronization signal 86 derived from the video input. Otherwise, the system of FIG. 6 functions in the same way as that of FIG. 2, with the output of a high-speed analog-to-digital converter 88 (which converts the analog incoming video signal into digital form on a pixel-by-pixel basis under the control of the scan circuits 28) being substituted in FIG. 6 for the output of the image memory 24 of FIG. 2.

In the discussion of the preferred embodiments, it has been assumed that the information levels are a linear function of the actual information, and that the brightness of the display is a linear function of the display level signal. If these assumptions are not in fact true, it is an easy matter to appropriately modify the transfer function of the look-up tables in accordance with well-known mathematical principles.

I claim:

1. Apparatus for displaying image information consisting of pixels having discrete digitally encoded intensities, comprising:
    (a) a source of digitized intensity information for each pixel, said intensity information being in the form of a first predetermined number of information levels;
    (b) display means capable of displaying pixels at a second predetermined number of discrete display intensity levels in response to digitized display control signals;
    (c) transfer means for converting each of said information levels into one of said display control signals in accordance with a first predetermined transfer function in a first area of said display, and in accordance with a second predetermined transfer function in a second area of said display; and
    (d) highlighting means for selecting said second transfer function in said second area of said display, said second area being selectable;
    (e) said first and second transfer functions being such that level changes in a constant direction in said information level produce level changes in a constant direction in said display intensity level so as to change the brightness and/or contrast of said display but not its informational content.

2. Apparatus for displaying image information consisting of pixels having digitally encoded intensities, comprising:
    (a) a source of digitized intensity information for each pixel, said intensity information being in the form of a first predetermined number of information levels;
    (b) display means capable of displaying pixels at a second predetermined number of discrete intensity levels in response to digitized display control signals, said display intensity levels corresponding to said information levels in accordance with a predetermined correspondence function;
    (c) first transfer means for converting each of a first range of said information levels into a corresponding display level in accordance with a first transfer function;
    (d) second transfer means for converting each of a second range of said information levels into a corresponding display level in accordance with a second transfer function; and
    (e) means for defining a highlight area within said image wherein pixels outside said highlight area are displayed in accordance with the conversion produced by said first transfer means, and wherein pixels inside said highlight area are displayed in accordance with the conversion produced by said second transfer means, said first and second transfer functions being such that level changes in a constant direction in said information level produce level changes in a constant direction in said display intensity level so as to change the brightness and/or contrast of said display but not its informational content.

3. The apparatus of claim 2, in which said highlight area defining means include means for selecting the size and position of said highlight area within said image.

4. The apparatus of claim 2, in which said second range is a portion of said first range.

5. The apparatus of claim 2, in which the display brightness corresponding to each of said display levels is increased inside said highlight area.

6. The apparatus of claim 5, in which said display brightness is achieved by increasing the gain of said display means.

7. Apparatus for displaying image information consisting of pixels having digitally encoded intensities, comprising:
    (a) a source of digitized intensity information for each pixel, said intensity information being in the form of a first predetermined number of information levels;
    (b) display means capable of displaying pixels at a second predetermined number of discrete intensity levels in response to digitized display control signals, said display intensity levels corresponding to said information levels in accordance with a predetermined correspondence function;
    (c) first transfer means for converting each of a first range of said information levels into a corresponding digital display level in accordance with a first transfer function within a first area of said display;
    (d) second transfer means for converting each of a second range of said information levels into a corresponding digital display level in accordance with a second transfer function distinct from said first transfer function within a selectable second area of said display;
    (e) said first and second transfer functions being such that changes in a constant direction in said information levels produce changes in a constant direction in said display intensity levels both in said first area and in said second area so as to change the brightness and/or contrast of said display but not its informational content;

(f) highlighting means for selecting said second transfer function in said second area of said display;

(g) converter means for converting digital display level data produced by said transfer means into an analog signal; and (h) amplifying means for amplifying said analog signal;

(i) said display means being arranged to display image pixels with a brightness proportional to said amplified analog signal.

8. The apparatus of claim 7, in which said display brightness increase is achieved by increasing the gain of said amplifying means.

9. The apparatus of claim 7, in which said display brightness increase is achieved by multiplying said digital data by a predetermined multiplier in said converter means.

10. The apparatus of claim 7, in which said display means is a cathode ray tube, and said display brightness increase is achieved by increasing the number of active electron guns of said cathode ray tube while scanning the highlighted display area.

11. The apparatus of claim 5, in which said display brightness increase is achieved by using higher display levels in said second transfer function than in said first transfer function.

12. A method of eliminating contouring effect and reducing gray scale inversion round-off errors in a CRT display having a predetermined number of equally spaced discrete display intensity levels, said display being a display of digitized image information having a lesser number of equally spaced information levels, comprising the steps of:

(a) providing a display control signal having a number of control signal levels equal to the number of display intensity levels to be displayed; and (b) converting each of said information levels to a corresponding display control signal level by a transfer function such that no step from one information level to the next causes more than a predetermined percentage change in said display intensity level;

whereby display intensity percentage changes when going from one information level to the next that are large enough to cause contouring and/or round-off errors are avoided in the display.

13. The method of claim 12, in which no display intensity level lower than a predetermined minimum display intensity level corresponds to any information level.

14. The method of claim 13, in which said predetermined percentage change is substantially 2%, and said minimum display intensity level is substantially 50.

15. The method of claim 13, in which said minimum display intensity level is substantially the 50th of a plurality of equally spaced display intensity levels.

16. The apparatus of claim 1, in which said information level change direction and said display intensity level change direction are the same.

17. The apparatus of claim 1, in which said information level change direction and said display intensity level change direction are opposite.

* * * * *